United States Patent

[11] 3,630,022

| [72] | Inventor | Albert Jubb |
| | | Kenilworth, Warwickshire, England |
| [21] | Appl. No. | 857,026 |
| [22] | Filed | Sept. 11, 1969 |
| [45] | Patented | Dec. 28, 1971 |
| [73] | Assignee | Rolls Royce Limited |
| | | Derby, England |
| [32] | Priority | Sept. 14, 1968 |
| [33] | | Great Britain |
| [31] | | 43,819/68 |

[54] GAS TURBINE ENGINE POWER PLANTS
8 Claims, 2 Drawing Figs.

[52] U.S. Cl. .................................................. 60/36,
60/102, 60/105, 60/108
[51] Int. Cl. ........................................ F01k 13/02
[50] Field of Search ........................................ 60/36, 38,
49, 88, 105, 102, 108, 975; 415/39

[56] References Cited
UNITED STATES PATENTS

| 3,097,487 | 7/1963 | Clark | 60/73 |
| 3,198,710 | 8/1965 | Long | 60/36 X |
| 3,360,939 | 1/1968 | Beldecos | 60/105 X |

*Primary Examiner*—Martin P. Schwadron
*Assistant Examiner*—Allen M. Ostrager
*Attorney*—Cushman, Darby & Cushman ABSTRACT: A closed-cycle gas turbine engine power plant employing a nuclear reactor to heat its working fluid, helium, is provided with a bypass valve whereby a variable amount of the helium compressed by the compressor or compressors may be caused to bypass the nuclear reactor and flow directly to the inlet of the turbine or turbines, thus enabling the turbine inlet temperature, and therefore the power output of the power plat, to be varied much more quickly than can be achieved by varying the heat output of the nuclear reactor.

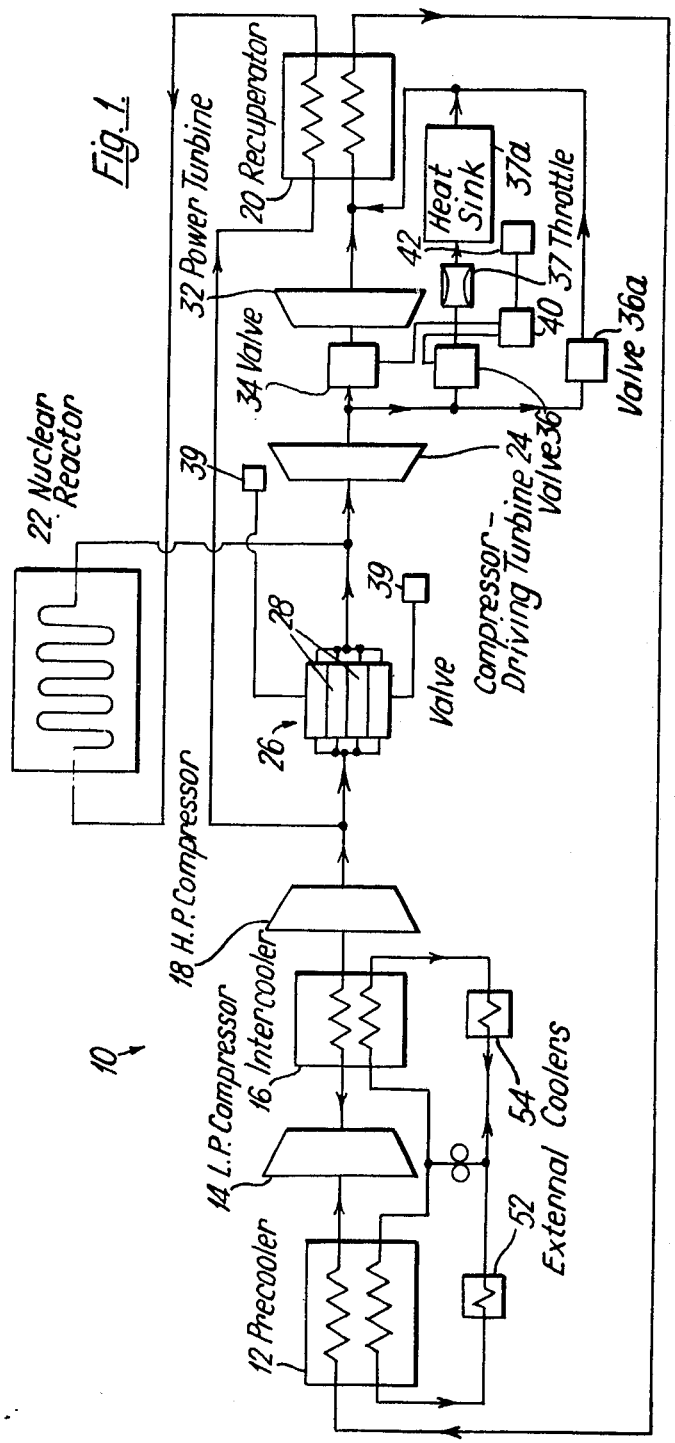

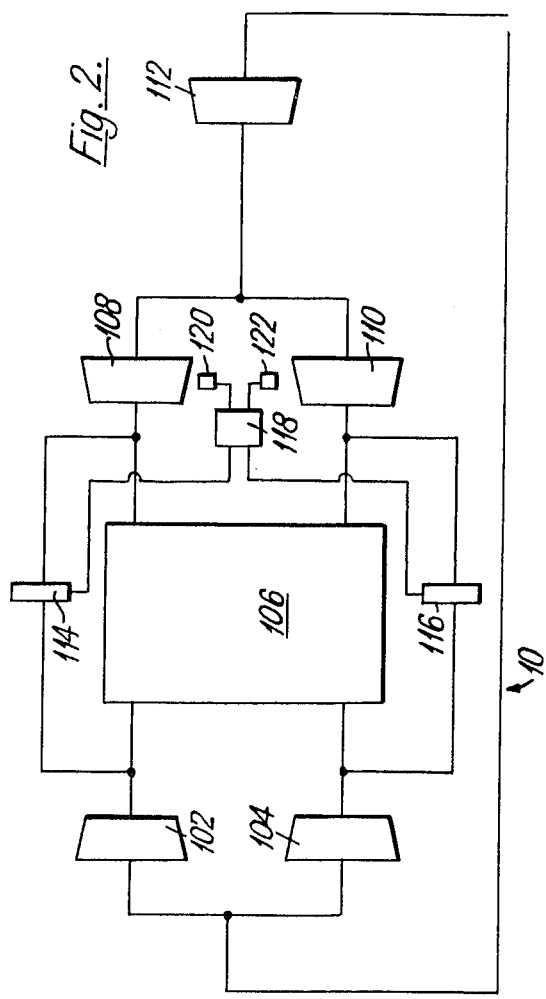

GAS TURBINE ENGINE POWER PLANTS

This invention relates to gas turbine engine power plants in which the working fluid is heated directly or indirectly by a nuclear reactor.

According to the present invention a gas turbine engine power plant comprises compressor means, nuclear reactor means adapted to receive and heat-working fluid compressed by the compressor means, turbine means arranged to receive and be driven by working fluid heated by the nuclear reactor means and control valve means operative to permit part of the working fluid compressed by the compressor means to bypass the nuclear reactor means and flow to the inlet of the turbine means in dependence upon at least one operating parameter of the turbine means.

The turbine means may comprise, in flow series, a high-pressure turbine drivingly connected to the compressor means and a power turbine, the control valve means being responsive to the rotational speed of the high-pressure turbine.

There may additionally be provided further compressor means arranged, in parallel with the first-mentioned compressor means, to supply compressed working fluid to be heated by the nuclear reactor means, a further high-pressure turbine which is drivingly connected to the further compressor means and arranged to receive and be driven by working fluid heated by the nuclear reactor means and which is in flow series with the power turbine, and further control valve means operative to permit part of the working fluid compressed by the further compressor means to bypass the nuclear reactor means and flow to the inlet of the further high-pressure turbine in dependence upon the rotational speed of the further high-pressure turbine.

Where there are two compressor means, two control valve means and two high-pressure turbines, there may also be provided control means adapted to produce a signal dependent upon the difference between the rotational speeds of the high-pressure turbines, said signal being operative to adjust one or other of the control valve means so as to reduce said difference.

The or each control valve means may be operative to prevent the rotational speed of the or its respective high pressure turbine from exceeding a predetermined value.

The or each control valve means is preferably arranged to be operated by at least two rotational speed governors driven by the or its respective high-pressure turbine, and preferably comprises a plurality of simultaneously operable control valves connected in parallel with each other.

The or each control valve means may also be responsive to the rotational speed of the power turbine and/or to the load on the power turbine.

The invention will now be described, by way of nonlimitative example only, with reverence to the accompanying drawings, of which:

FIG. 1 is a schematic diagram of one embodiment of a gas turbine engine power plant in accordance with the invention; and FIG. 2 is a simplified schematic diagram of a further embodiment of a gas turbine engine power plant in accordance with the invention. In FIG. 1 there is shown a closed-cycle gas turbine engine power plant 10 employing helium as a working fluid and comprising, in flow series, a precooler 12 in which the helium passes in heat-exchange relationship with water, an axial flow low-pressure compressor 14, an intercooler 16 in which the helium again passes in heat-exchange relationship with water, and an axial flow high-pressure compressor 18. Helium compressed in the compressors 14, 18 passes, via a recuperator 20 in which it is preheated as will hereinafter be described, to be heated in a nuclear reactor 22. The helium forms the coolant of the reactor 22, and is thus directly heated therein: it will be appreciated, however, that the reactor 22 could have a separate coolant system in which the coolant is arranged to heat the helium. The heated helium from the reactor 22 then passes to and drives a high-pressure axial flow turbine 24 which is drivingly connected to the compressors 14, 18 by a shaft (not shown).

Control valve means 26, in the form of a plurality of simultaneously operable control valves 28 connected in parallel, is provided in a duct 30 between the outlet of the compressor 18 and the inlet of the turbine 24, whereby a variable part of the helium compressed in the compressors 14, 18 may bypass the recuperator 20 and the reactor 22.

Helium expanded in the turbine 24 passes to and drives an axial flow power turbine 32 via a throttle valve 34. The power turbine 32 is drivingly connected to a load such as an alternator (not shown). A control valve 36, a throttle or restrictor 37 and heat sink 37a are connected in flow series in a duct 38 between the outlet of the turbine 24 and the outlet of the turbine 32, whereby a variable part of the helium expanded in the turbine 24 may bypass the throttle valve 34 and the turbine 32.

The heat sink 37a may comprise a large mass, for example 40 tons, of graphite blocks (not shown). A further speed-responsive control valve 36a is connected in parallel with the control valve 36, throttle 37 and heat sink 37a. The flow area of the control valve 36a is roughly equivalent to the flow area of the turbine 32. The outlet of the turbine 32 communicates with the recuperator 20, where the helium exhausted from the turbine 32 passes in heat-exchange relationship with and therefore preheats the helium compressed by the compressors 14, 18 and is itself cooled, the cooled helium then passing back to the inlet of the precooler 12.

The control valve means 26 is responsive to the rotational speed of the turbine 24 by way of two variable speed governors 39, two governors being provided for safety reasons. The control valve mean is also responsive to the rotational speed of, and the load on, the turbine 32 by means not shown, but overriding control is exercised by the governors 39.

The thermal characteristics of the reactor 22 are such that its outlet temperature, once set to its normal operating value, cannot readily be varied rapidly. During starting of the power plant 10, and at all speeds below its normal operating speed, therefore, the helium reaching the turbine 24 tends to be too hot, which in turn tends to cause overspeeding of the turbine 24. Thus in practice the setting of the governors 39 is progressively increased during starting of the power plant 10 by means not shown: as each set speed is reached the control valve means 26 starts to open, permitting a variable amount of relatively cool helium to flow directly from the outlet of the compressor 18 to the inlet of the turbine 24. The temperature at the inlet of the turbine 24 is thus adjusted to a value consistent with the relevant set speed, and the rotational speed thereof stabilizes at each set speed in turn, until its normal operating speed is attained. Once the normal operating speed is attained, the governors 39 are set to act, via the control valve means 26, as top speed limiters.

The overall power output of the power plant 10 is thus controlled by the action of the governors 39 on the control valve means 36.

The throttle valve 34 and the control valve 36 have a common control device 40 which is responsive to the rotational speed of the turbine 32 by way of a speed sensor 42. During starting of the power plant 10 the control valve 36a is set to be fully open, while the throttle valve 34 is set fully open and the control valve 36 is set closed by the control device 40. The flow path through the control valve 36a in this condition considerably reduces the back pressure on the turbine 24, making starting thereof more easy, while still permitting the turbine 32 to start up slowly. When the rotational speed of the turbine 32 reaches a first predetermined value the control valve 36a starts to close, thus speeding up the starting of the turbine 32 to its normal operating speed: at this speed the valve 36a is fully closed.

Thereafter, should the rotational speed of the turbine 32 overspeed by say, more than 10 percent of its maximum speed, for example when the load of the turbine is suddenly reduced, the throttle valve 34 is rapidly closed and the control valve 36 is simultaneously rapidly opened by the control device 40 (typically in 100 milliseconds), thus preventing damage to the turbine 32 by permitting the helium from the turbine 24 to bypass the turbine 32 and flow through the throttle 37 and heat sink 37a.

The throttle 37 and heat sink 37a produce substantially the same pressure and temperature drop in the helium flowing therethrough as would be produced by the turbine 32, thus ensuring that the effect of bypassing the turbine 32 on the remainder of the cycle is minimized. It will be appreciated that the control valve 36a or the control device 40 may also effect continuous small adjustments in response to small changes in the speed of the turbine 32. It will also be appreciated that by suitable modification of the control device 40 and the control valve 36, the control valve 36 may be made to perform the functions of the control valve 36a in addition to its own functions, thus permitting the control valve 36a to be omitted. Relatively pure water is pumped to the precooler 12 and to the intercooler 16 from the outlet of a variable speed pump 50. The water leaving the precooler 12 and the intercooler 16 returns to the inlet of the pump 50 via respective external coolers 52 and 54 in which it passes in heat-exchange relationship with, for example, sea or river water. The sea or river water is caused to flow through the external coolers 52, 54 by a further variable speed pump or pumps (not shown).

The power output of the power plant 10 may be finally adjusted by varying the temperature of the helium leaving the precooler 12 and the intercooler 16. In practice the speed of the pump 50, and therefore the flow rate of the relatively pure water, is kept substantially constant and the speed of the further pump is varied so as to vary the flow rate of the sea or river water and thus vary the temperature of the relatively pure water. It will be appreciated, however, that if desired the flow rate of the relatively pure water may be varied instead of, or as well as, its temperature.

It will be appreciated that the invention is applicable to gas turbine engine power plants other than closed-cycle gas turbine engine power plants incorporating a nuclear reactor for heating purposes.

In FIG. 2 there is shown, in simplified form, a closed-cycle gas turbine engine power plant 100 employing helium as a working fluid and comprising two axial flow compressors 102 and 104 arranged in parallel. Helium compressed by the compressors 102, 104 passes to be heated, as described with reference to FIG. 1, in a nuclear reactor 106. The helium from the compressors 102, 104 respectively may be provided with a common flow path or with separate flow paths within the reactor 106.

Heated helium from the reactor 106 passes to and drives two high-pressure axial flow turbines 108, 110 which are arranged in parallel and which are respectively drivingly connected to the compressors 102, 104 by respective shafts (not shown), and thence passes to and drives a single axial flow power turbine 112. Helium exhausted from the power turbine 112 returns to the respective inlets of the compressors 102, 104.

It will be appreciated that the power plant 110 may be provided with precoolers, intercoolers, recuperators, and a control valve and throttle valve arrangement similar to that described with reference to FIG. 1.

Between the outlet of each compressor 102, 104 and the inlet of its respective turbine 108, 110 there are provided respective control valve means 114, 116 similar to that described with reference to FIG. 1. Additionally, however, there is provided a control device 118 responsive, by way of speed sensors 120, 122 respectively, to the rotational speeds of the turbines 108, 110 and adapted to produce a control signal dependent on the difference between the rotational speeds. This control signal is operative to open, or increase the opening of, whichever of the control valve means 114, 116 is associated with the turbine of the turbines 108, 110 having the higher speed, thus slowing down the turbine until the speeds are substantially equal.

It will be appreciated that the control device 118 could alternatively be arranged to act on the control valve means 114, 116 so as to increase the speed of the slower of the turbines 108, 110.

I claim:

1. A gas turbine engine power plant comprising compressor means, nuclear reactor means adapted to receive and heat working fluid compressed by the compressor means, turbine means arranged to receive and be driven by working fluid heated by the nuclear reactor means and control valve means operative to permit part of the working fluid compressed by the compressor means to bypass the nuclear reactor means and flow to the inlet of the turbine means in dependence upon at least one operating parameter of the turbine means.

2. A power plant as claimed in claim 1, wherein the turbine means comprises in flow series, a high-pressure turbine drivingly connected to the compressor means and a power turbine, the control valve means being responsive to the rotational speed of the high-pressure turbine.

3. A power plant as claimed in claim 2, wherein there is provided further compressor means arranged, in parallel with the first-mentioned compressor means, to supply compressed working fluid to be heated by the nuclear reactor means, a further high-pressure turbine which is drivingly connected to the further compressor means and arranged to receive and be driven by working fluid heated by the nuclear reactor means and which is in flow series with the power turbine, and further control valve means operative to permit part of the working fluid compressed by the further compressor means to bypass the nuclear reactor means and flow to the inlet of the further high pressure turbine in dependence upon the rotational speed of the further high-pressure turbine.

4. A power plant as claimed in claim 3, where there is provided control means adapted to produce a signal dependent upon the difference between the rotational speeds of the high-pressure turbines, said signal being operative to adjust one or other of the control valve means so as to reduce said difference.

5. A power plant as claimed in claim 2, wherein the control valve means is operative to prevent the rotational speed of the high-pressure turbine from exceeding a predetermined value.

6. A power plant as claimed in claim 2, wherein the control valve means is arranged to be operated by at least two rotational speed governors driven by the high-pressure turbine.

7. A power plant as claimed in claim 2, wherein the control valve means is also responsive to the rotational speed of the power turbine.

8. A power plant as claimed in claim 1, wherein the control valve means comprises a plurality of simultaneously operable control valves connected in parallel with each other.

* * * * *